US008729473B2

United States Patent
Meinel et al.

(10) Patent No.: US 8,729,473 B2
(45) Date of Patent: *May 20, 2014

(54) INFRARED LIGHT TRANSMISSIVITY FOR A MEMBRANE SENSOR

(71) Applicant: Texas Instruments Incorporated, Dallas, TX (US)

(72) Inventors: Walter Meinel, Tucson, AZ (US); Kalin Lazarov, Colorado Springs, CO (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/855,924

(22) Filed: Apr. 3, 2013

(65) Prior Publication Data

US 2013/0214159 A1    Aug. 22, 2013

Related U.S. Application Data

(62) Division of application No. 12/878,752, filed on Sep. 9, 2010, now Pat. No. 8,436,304.

(51) Int. Cl.
*G01J 5/02* (2006.01)
*G01J 5/12* (2006.01)

(52) U.S. Cl.
CPC . *G01J 5/12* (2013.01); *G01J 5/0225* (2013.01)
USPC ........................................ 250/338.1

(58) Field of Classification Search
CPC ................................ G01J 5/12; G01J 5/0225
USPC .............................. 250/338.1, 338.4
See application file for complete search history.

(56) References Cited

U.S. PATENT DOCUMENTS

| 6,565,254 B2* | 5/2003 | Sato et al. | 374/132 |
| 6,863,438 B2* | 3/2005 | Pannek et al. | 374/121 |
| 2011/0305258 A1* | 12/2011 | Boutchich et al. | 374/130 |

* cited by examiner

*Primary Examiner* — Constantine Hannaher
(74) *Attorney, Agent, or Firm* — Lawrence J. Bassuk; Wade J. Brady, III; Frederick J. Telecky, Jr.

(57) ABSTRACT

In conventional membrane infrared (IR) sensors, little to no attention has been paid toward transmissivity of IR near metal traces. Here, because the substrate of an integrated circuit carrying the sensor is used as a visible light filter, reflection of IR radiation back into the substrate can affect the operation and reliability of the IR sensor. As a result, an arrangement is provided that reduces the area occupied by metal lines by reducing the pitch and compacting the routing so as to reduce the effects from the reflection of IR radiation by metal traces.

8 Claims, 7 Drawing Sheets

INFRARED LIGHT TRANSMISSIVITY FOR A MEMBRANE SENSOR

This Application is a Divisional of prior application Ser. No. 12/878,752, filed Sep. 9, 2010, now U.S. Pat. No. 8,436,304, issued May 7, 2013.

TECHNICAL FIELD

The invention relates generally to infrared (IR) sensors and, more particularly, to reducing IR reflectivity for an IR membrane sensor.

BACKGROUND

In conventional membrane IR sensors, little to no attention has been paid toward transmissivity of IR near metal traces. Because of the arrangement of these membrane sensors, reflection of IR was generally not a factor. However, when the sensor absorber is behind the metal traces (for example, a Wafer Level Chip Scale Package or WCSP package) the metal traces can substantially block or reflect the IR radiation away from the absorber and can affect the operation and reliability of the IR sensor. Therefore, there is a need to increase the transmissivity of a membrane IR sensor that uses the substrate as a visible light filter.

An example of a conventional system is PCT Publ. No. WO2010029488.

SUMMARY

A preferred embodiment of the present invention, accordingly, provides an apparatus. The apparatus comprising a substrate; a plurality of polysilicon traces formed over the substrate, wherein each polysilicon trace has a first width, and wherein the plurality of polysilicon traces occupy a first area; a recess formed in the substrate below at least a portion of each polysilicon trace; a first dielectric layer formed over the polysilicon traces; a plurality of metal traces formed over the first dielectric layer, wherein each metal trace has a second width, and wherein the second width is less than the first width, and wherein the plurality of metal traces occupy a second area, and wherein each metal trace is associated with at least one of the polysilicon traces to form a pair of electrodes for a thermopile, and wherein the horizontal spacing between adjacent metal traces is reduced so that the second area is substantially less than first area; and a second dielectric layer formed over the metal traces.

In accordance with a preferred embodiment of the present invention, the metal traces are formed in a single metallization layer.

In accordance with a preferred embodiment of the present invention, the first dielectric layer is further comprised of a plurality of dielectric layers.

In accordance with a preferred embodiment of the present invention, the plurality of dielectric layers are formed of silicon dioxide.

In accordance with a preferred embodiment of the present invention, the metal traces are formed of a plurality of metallization layers.

In accordance with a preferred embodiment of the present invention, the first dielectric layer is further comprised of a plurality of dielectric layers.

In accordance with a preferred embodiment of the present invention, the plurality of dielectric layers are formed of silicon dioxide.

In accordance with a preferred embodiment of the present invention, the second area is less than about three-quarters the first area.

In accordance with a preferred embodiment of the present invention, an apparatus is provided. The apparatus comprises a substrate; an infrared (IR) sensor formed over a first portion of the substrate, wherein the IR sensor includes a thermopile and a plurality of sections, and wherein each section includes: a plurality of polysilicon traces formed over the substrate, wherein each polysilicon trace has a first width, and wherein the plurality of polysilicon traces occupy a first area; a recess formed in the substrate below at least a portion of each polysilicon trace; a dielectric layer formed over the polysilicon traces; and a plurality of metal traces formed over the dielectric layer, wherein each metal trace has a second width, and wherein the second width is less than the first width, and wherein the plurality of metal traces occupy a second area, and wherein each metal trace is associated with at least one of the polysilicon traces to form a pair of electrodes for a thermopile, and wherein the horizontal spacing between adjacent metal traces is reduced so that the second area is substantially less than first area; a second dielectric layer formed over the metal traces; and an IR absorber formed over the second dielectric layer; and active circuitry that is formed over a second portion of the substrate, wherein the active circuitry is in communication with the IR sensor.

In accordance with a preferred embodiment of the present invention, an apparatus is provided. The apparatus comprises an integrated circuit (IC) including: a substrate; an IR sensor formed over a first portion of the substrate, wherein the IR sensor includes a thermopile and a plurality of sections, and wherein each section includes: a plurality of polysilicon traces formed over the substrate, wherein each polysilicon trace has a first width, and wherein the plurality of polysilicon traces occupy a first area; a recess formed in the substrate below at least a portion of each polysilicon trace; a first dielectric layer formed over the polysilicon traces; a plurality of metal traces formed over the dielectric layer, wherein each metal trace has a second width, and wherein the second width is less than the first width, and wherein the plurality of metal traces occupy a second area, and wherein each metal trace is associated with at least one of the polysilicon traces to form a pair of electrodes for a thermopile, and wherein the horizontal spacing between adjacent metal traces is reduced so that the second area is substantially less than first area; a second dielectric layer formed over the metal traces; and an IR absorber formed over the second dielectric layer; and active circuitry that is formed over a second portion of the substrate, wherein the active circuitry is in communication with the IR sensor; a plurality of solder balls that are each secured to the IC; and a circuit board having a plurality of contact pad, wherein each contact pad is secured to at least one of the solder balls.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Refer now to the drawings wherein depicted elements are, for the sake of clarity, not necessarily shown to scale and wherein like or similar elements are designated by the same reference numeral through the several views.

Figure 1:
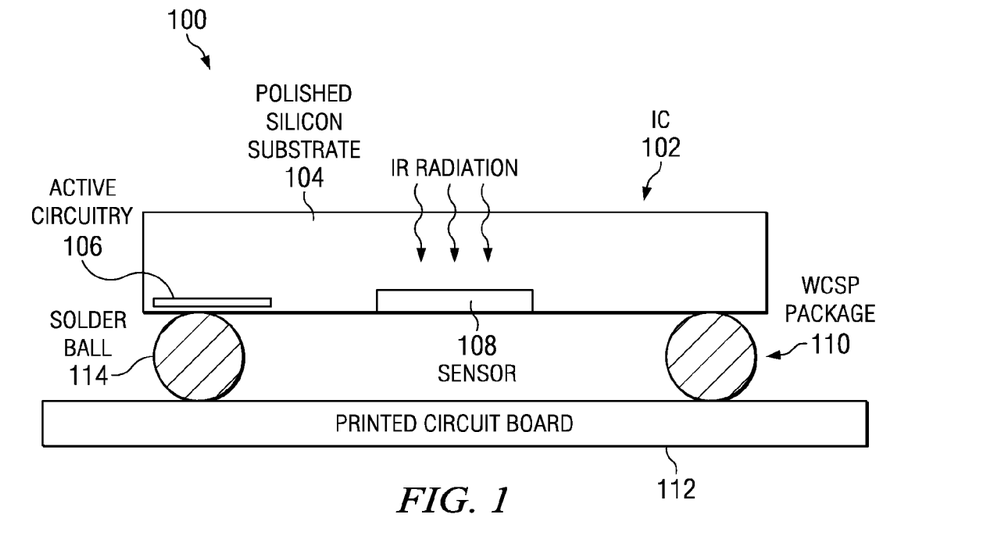
FIG. 1 is a block diagram of an example of a system in accordance with a preferred embodiment of the present invention.

Turning to FIG. 1, an example of a system 100 in accordance with a preferred embodiment of the present invention can be seen. As shown, an IC 102 is secured to a circuit board 112 by a WCSP package, where solder balls 114 are secured to both the IC 102 and contact pads (not shown) on the circuit board 112. Within IC 102 is an IR sensor 102 and active circuitry 104, which are formed over a substrate 104. For this sensor, the substrate 104 (which is generally formed of silicon) operates as a visible light filter, allowing IR radiation to pass to sensor 108.

Figure 2:
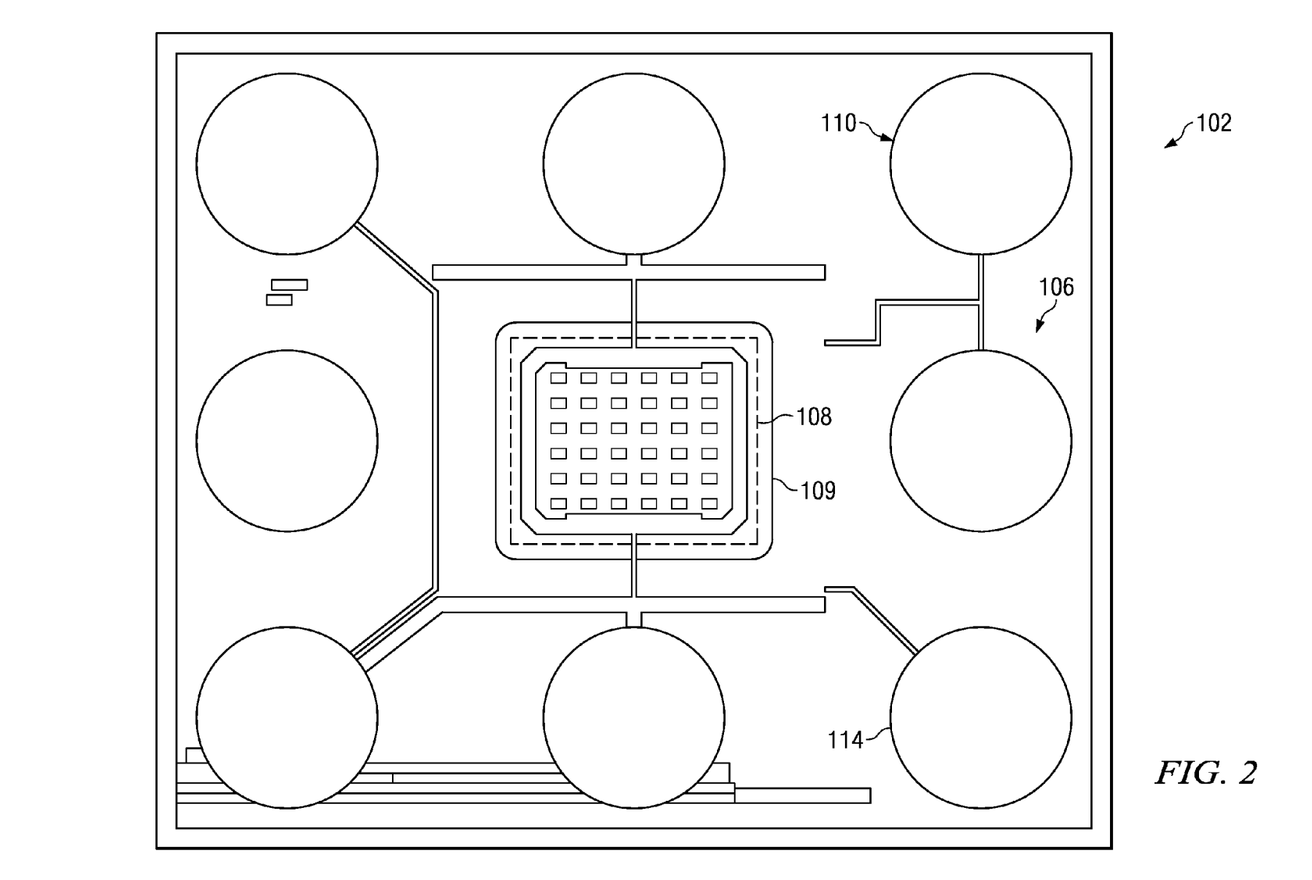
FIG. 2 is block diagram of an example of an integrated circuit (IC) of FIG. 1.

In FIG. 2, a plan view of an example of IC 102 can be seen. As shown, the sensor 108 is located substantially at the center of IC 102. Surrounding the sensor 108 is the active circuitry 106, which is in communication with the sensor 108. This active circuitry 106 extends over the solder balls 114, where communication can be established with an underlying circuit board (i.e., circuit board 112). Additionally, there is an IR filter 109 formed over the IR sensor 102.

Figure 3:
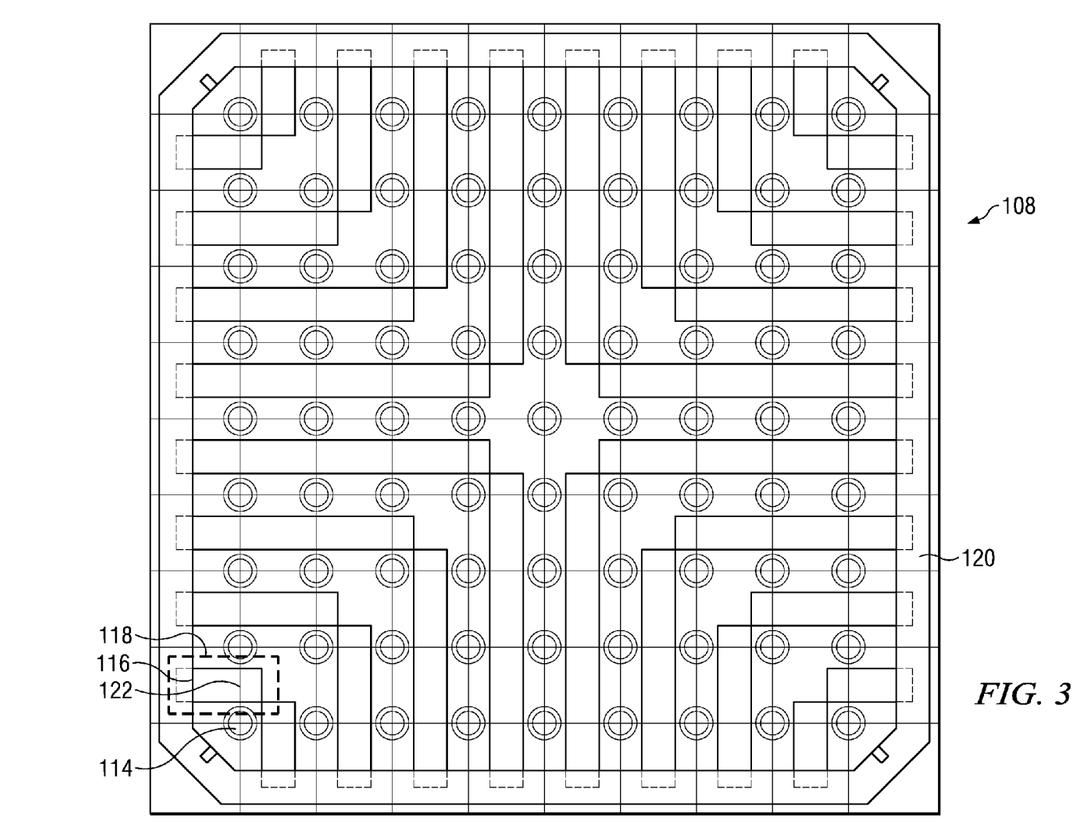
FIG. 3 is an block diagram of an example of the IR sensor of FIG. 2.

Looking to FIG. 3, a plan view of an example of IR sensor 108 can be seen. In this view, all of the layers of the IR sensor 108 are shown for the sake of illustration. As shown, the IR sensor 108 is substantially surrounded by an isolation ring 120 that separates the sensor 108 from the surrounding active circuitry 106. Generally, IR sensor 108 operates based on the Peltier effect, where a "hot junction" is formed over the center of sensor 108 and a "cold junction" is formed along the perimeter of the sensor 108. To do this, a dielectric stack 122 is formed over a portion of the center of the sensor 108, where openings (i.e., opening 114) are used to etch away a portion of the substrate underlying the dielectric stack 122. Electrodes 116, then, couple the "hot junction" and "cold junction" together forming a portion of a thermopile as shown for section 118.

Figure 4:
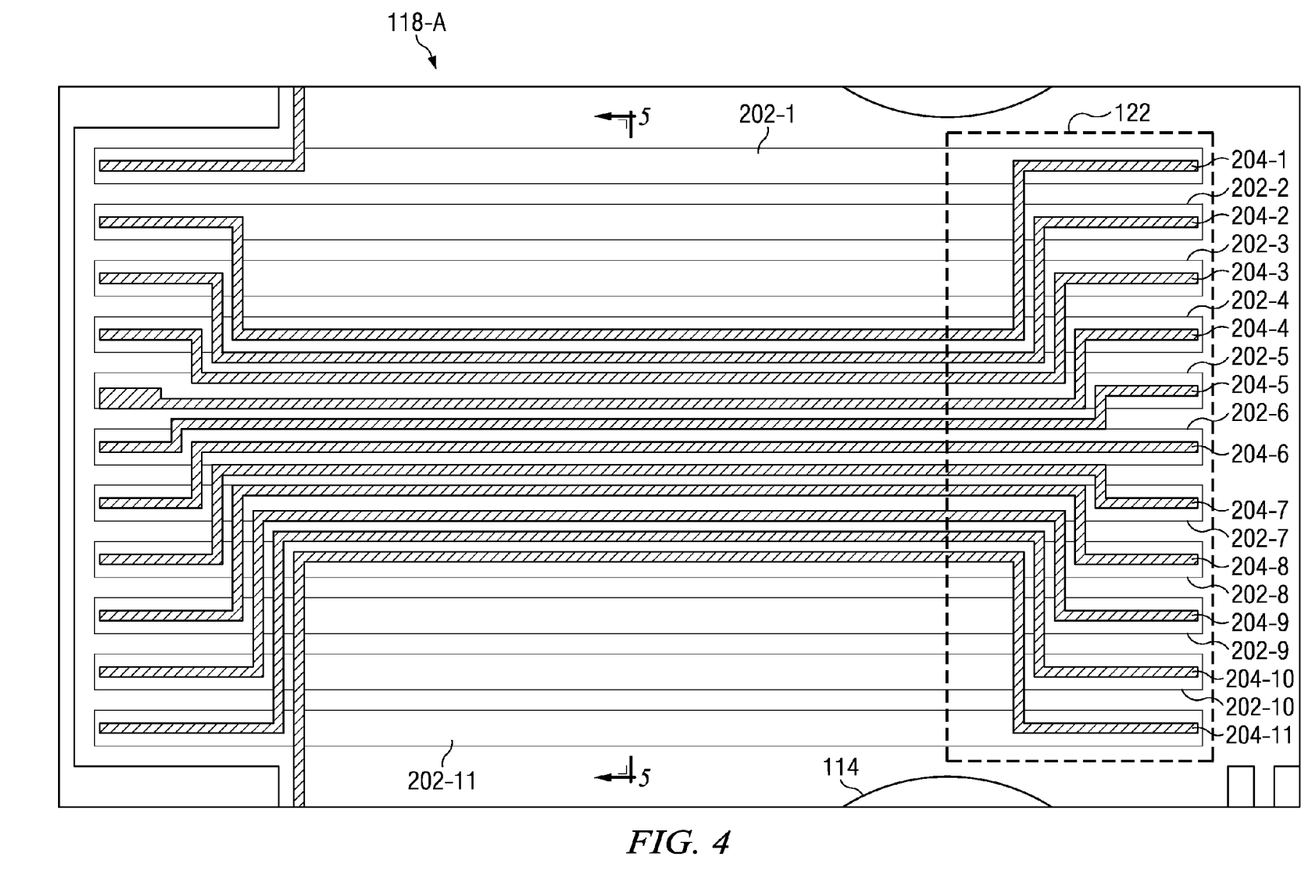
FIG. 4 is a plan view of an example of a section of the IR sensor of FIG. 3.
Figure 5:
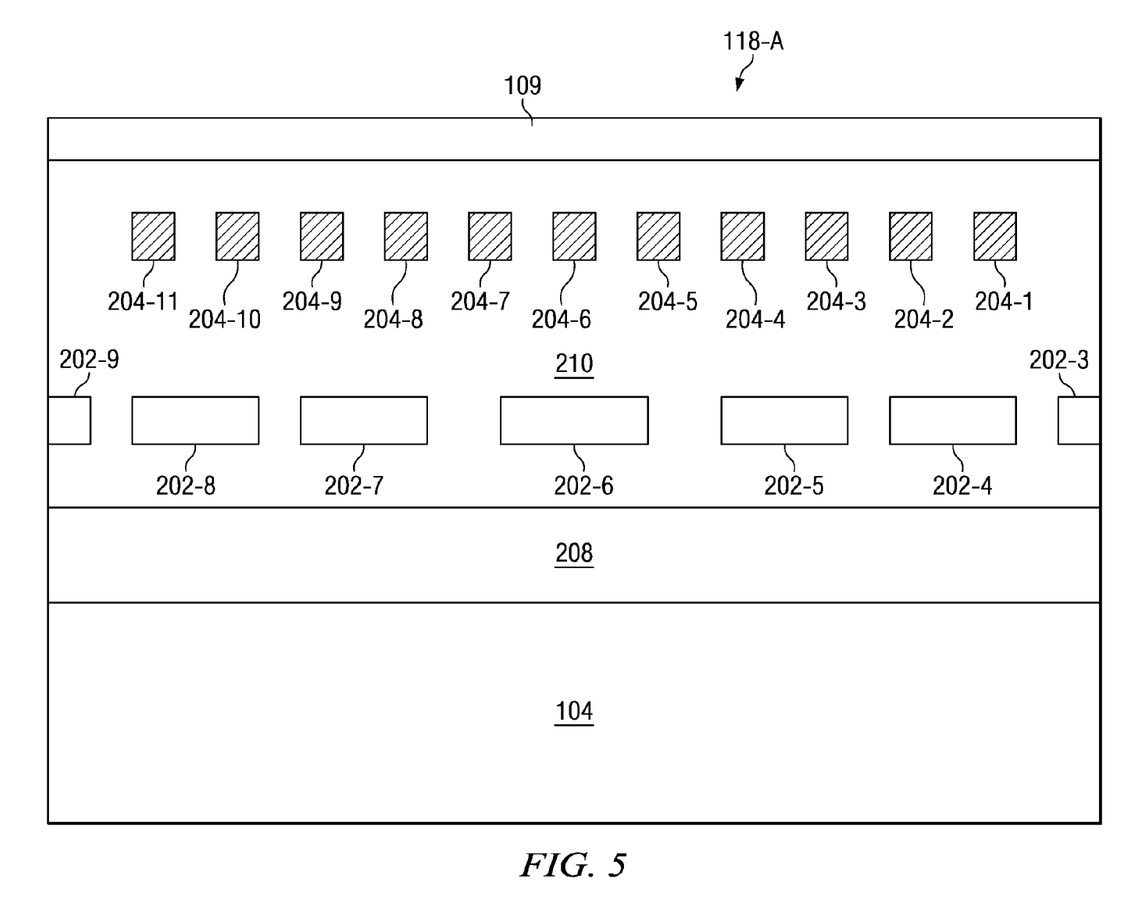
FIG. 5 is a cross-sectional view section of FIG. 4 along section line A-A.

Turning to FIGS. 4 and 5, an example of section 118 (referred to as 118-A) can be seen in greater detail. As with FIG. 3, the layers of section 118-A can be seen for the purposes of illustration. As shown, the electrodes are generally comprised of polysilicon traces 202-1 to 202-11 and metal traces 204-1 to 204-11, where each metal trace 204-1 to 204-11 is associated with polysilicon trace 202-1 to 202-11, respectively. The polysilicon traces 202-1 to 202-11 are generally parallel to one another over substrate 104 with recess or cavity 208 being formed under at least a portion of each polysilicon trace 202-1 to 202-11. The polysilicon traces 202-1 to 202-11 (which are each about 1.2 µm wide) occupy a generally rectangular area (which is typically between 360 µm$^2$ to about 1755 µm$^2$). The pitch and routing of the metal traces 204-1 to 204-11 (which each have a width of about 0.4 µm wide) is reduced so that the area occupied is substantially less than the area occupied by its corresponding polysilicon traces 202-1 to 202-11. For example, the area occupied by the metal traces 204-1 to 204-11 is about 283 µm$^2$, which is about three-quarters of the area occupied by polysilicon traces 202-1 to 202-11. As the polysilicon traces 202-1 to 202-11 and metal traces 204-1 to 204-11 become longer, the area occupied by metal traces 204-1 to 204-11 becomes increasingly smaller as compared to the area occupied by polysilicon traces 202-1 to 202-11. Additionally, as shown metal traces 202-1 to 202-11 are separated from polysilicon traces 204-1 to 201-11 by a dielectric (such as silicon dioxide), which may be formed of one or more layers. An IR absorber 109 covers the thermopile 118.

Figure 6:
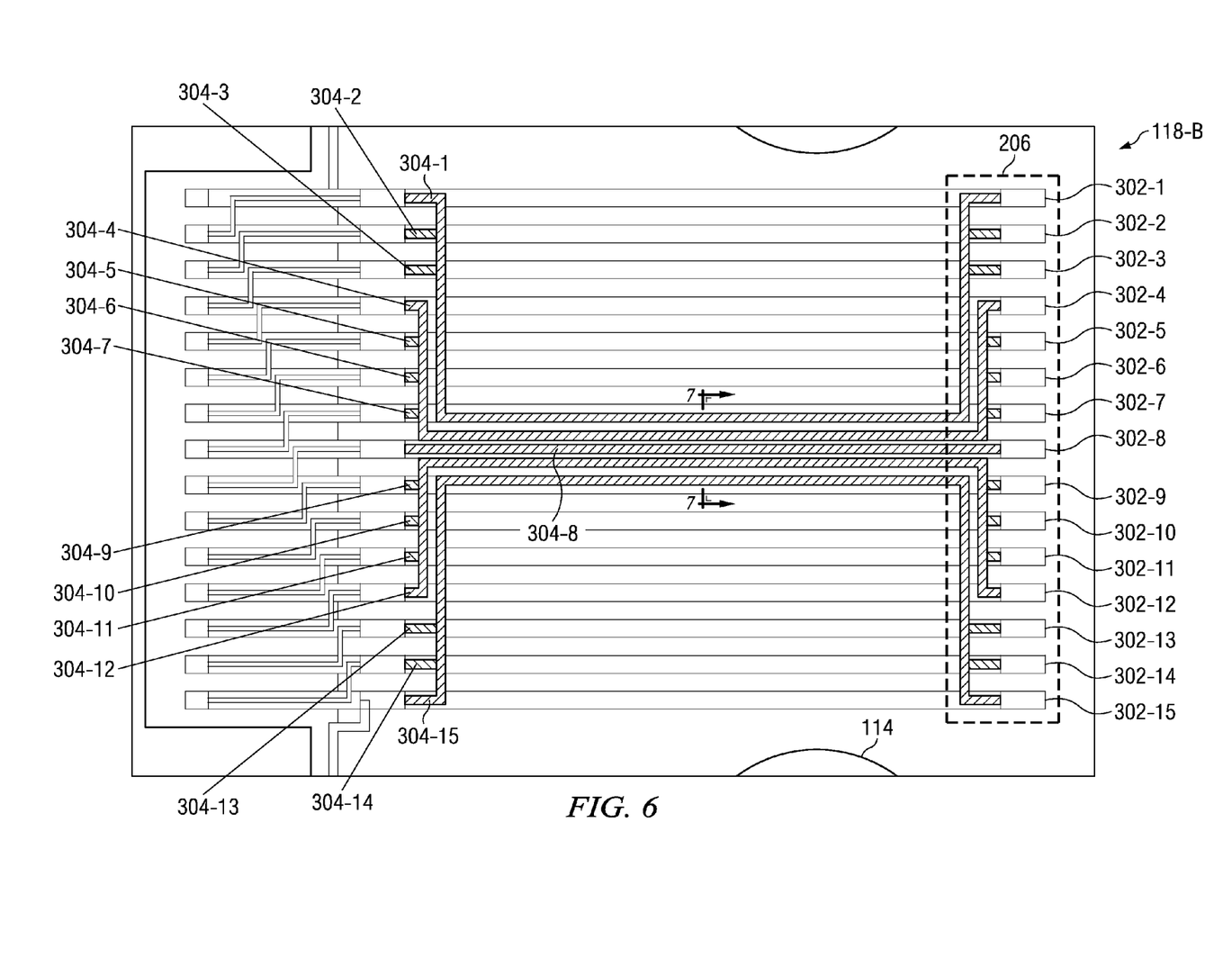
FIG. 6 is a plan view of another example of a section of the IR sensor of FIG. 3.
Figure 7:
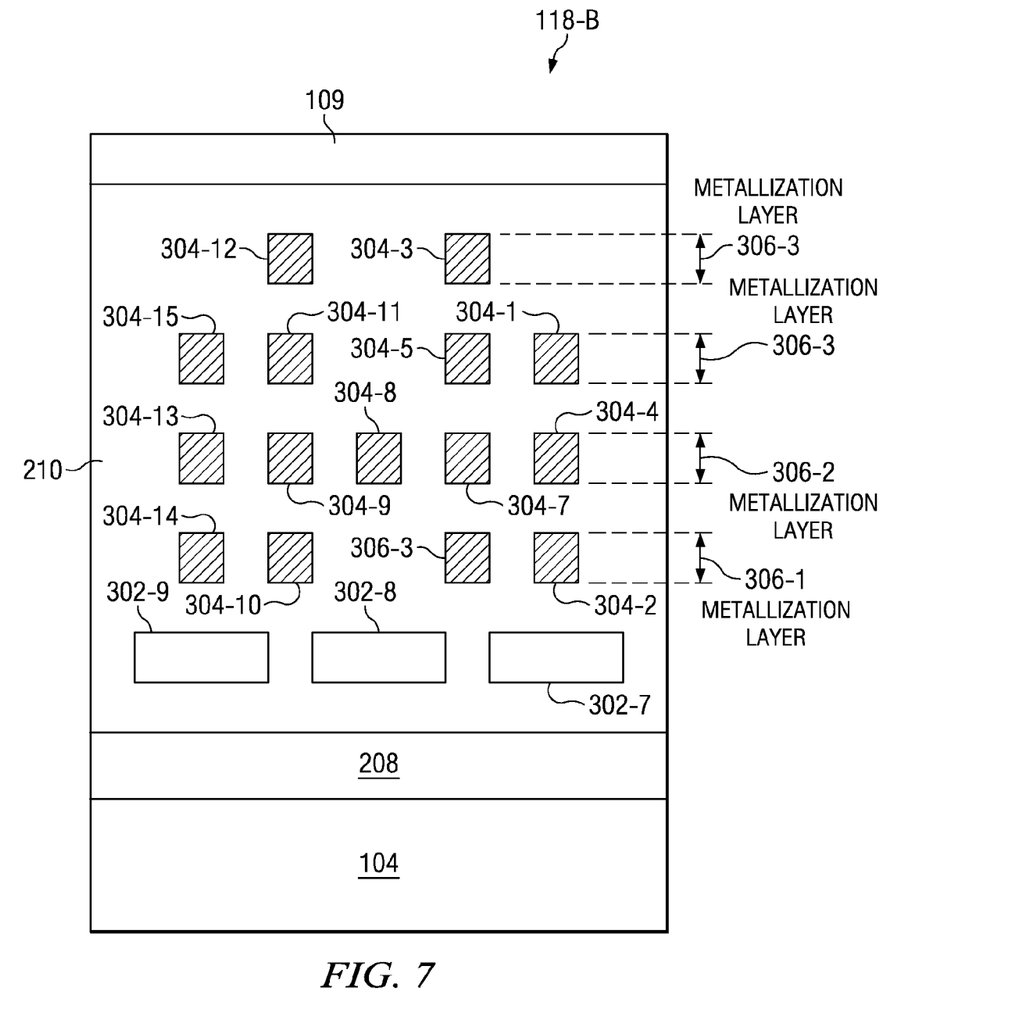
FIG. 7 is a cross-sectional view section of FIG. 6 along section line B-B.

Turning to FIGS. 6 and 7, another example of section 118 (referred to as 118-B) can be seen. Here, the metal traces 304-1 to 304-15 are formed of metallization layers 306-1 to 306-4 and are routed over top of one another, being separated from one another by a dielectric 120 (i.e., silicon dioxide) that can be formed in one or more layers. Because multiple metallization layers 306-1 to 306-15 have been used, the area occupied by metal layers 304-1 to 304-15 is much less than metal layers 204-1 to 204-11 (which use one metallization layer). In this example, the area occupied by metal layers 304-1 to 304-15 is less than half of the area occupied by polysilicon traces 302-1 to 302-15.

By using this reduced metal pitch and routing, the overall reflective area of metal traces (i.e., 204-1 to 204-11) can be greatly reduced. As an example, the total reflective area for the IR sensor 108 can be reduced by as much as 50%, improving the responsivity of the IR sensor 108.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

What is claimed is:

1. An apparatus comprising:
   A a substrate;
   B an infrared (IR) sensor formed over a first portion of the substrate, the IR sensor including a thermopile and a plurality of sections, each section including:
      i a plurality of polysilicon traces formed over the substrate, each polysilicon trace having a first width, and the plurality of polysilicon traces occupying a first area;
      ii a recess formed in the substrate below at least a portion of each polysilicon trace;
      iii a first dielectric layer formed over the polysilicon traces; and iv. a plurality of metal traces formed over the dielectric layer, each metal trace having a second width that is less than the first width, and the plurality of metal traces occupying a second area, each metal trace is associated with at least one of the polysilicon traces to form a pair of electrodes for a thermopile, the horizontal spacing between adjacent metal traces is reduced so that the second area is substantially less than first area;

v a second dielectric layer formed over the metal traces; and vi an IR absorber formed over the second dielectric layer; and C active circuitry formed over a second portion of the substrate, the active circuitry being in communication with the IR sensor.

2. The apparatus of claim 1 in which the metal traces are formed in a single metallization layer.

3. The apparatus of claim 2 in which the first dielectric layer includes a plurality of dielectric layers.

4. The apparatus of claim 3 in which the plurality of dielectric layers are formed of silicon dioxide.

5. The apparatus of claim 1 in which the metal traces are formed of a plurality of metallization layers.

6. The apparatus of claim 5 in which the first dielectric layer includes a plurality of dielectric layers.

7. The apparatus of claim 6 in which the plurality of dielectric layers are formed of silicon dioxide.

8. The apparatus of claim 1 in which the second area is less than about three-quarters of the first area.

\* \* \* \* \*